(12) United States Patent
Chen et al.

(10) Patent No.: US 10,728,176 B2
(45) Date of Patent: Jul. 28, 2020

(54) RULED-BASED NETWORK TRAFFIC INTERCEPTION AND DISTRIBUTION SCHEME

(71) Applicant: Extreme Networks, Inc., San Jose, CA (US)

(72) Inventors: Xiaochu Chen, San Ramon, CA (US); Ivy Pei-Shan Hsu, Dublin, CA (US); Eswara Chinthalapati, San Jose, CA (US); Sanjeev Chhabria, Castro Valley, CA (US)

(73) Assignee: Extreme Networks, Inc., San Jose, CA (US)

( * ) Notice: Subject to any disclaimer, the term of this patent is extended or adjusted under 35 U.S.C. 154(b) by 4 days.

(21) Appl. No.: 16/120,151

(22) Filed: Aug. 31, 2018

(65) Prior Publication Data

US 2019/0116133 A1 Apr. 18, 2019

Related U.S. Application Data

(63) Continuation of application No. 15/425,777, filed on Feb. 6, 2017, now Pat. No. 10,069,764, which is a (Continued)

(51) Int. Cl.
*H04L 12/935* (2013.01)
*H04L 12/931* (2013.01)
(Continued)

(52) U.S. Cl.
CPC ........ *H04L 49/3009* (2013.01); *H04L 12/467* (2013.01); *H04L 47/125* (2013.01);
(Continued)

(58) Field of Classification Search
CPC . H04L 12/467; H04L 47/125; H04L 49/3009; H04L 49/354; H04L 49/602;
(Continued)

(56) References Cited

U.S. PATENT DOCUMENTS 5,031,094 A 7/1991 Toegel et al.
5,359,593 A 10/1994 Derby et al.
(Continued)

FOREIGN PATENT DOCUMENTS

EP 2654340 A1 10/2013
IE 20070438 A1 2/2008
(Continued)

OTHER PUBLICATIONS

U.S. Appl. No. 60/169,502, filed Dec. 7, 1999.
(Continued)

*Primary Examiner* — Kan Yuen
(74) *Attorney, Agent, or Firm* — Sterne, Kessler, Goldstein & Fox P.L.L.C.

(57) ABSTRACT

Using a hash function, an L2/L3 switch can produce an FID for a data packet. The L2/L3 switch can select, from among potentially several stored VLAN flooding tables, a particular VLAN flooding table that is associated with a particular VLAN on which the data packet is to be carried. The rows of the particular VLAN flooding table can specify different combinations of the particular VLAN's egress ports. The L2/L3 switch can locate, in the particular VLAN flooding table, a particular row that specifies the FID. The L2/L3 switch can read, from the particular row, a specified subset of the egress ports that are associated with the particular VLAN. The L2/L3 switch can transmit copies of the data packet out each of the egress ports specified in the subset, toward analytic servers connected to those egress ports.

19 Claims, 6 Drawing Sheets

Related U.S. Application Data continuation of application No. 14/320,138, filed on Jun. 30, 2014, now Pat. No. 9,565,138.

(60) Provisional application No. 61/919,244, filed on Dec. 20, 2013.

(51) Int. Cl.
  H04L 12/803 (2013.01)
  H04L 12/46 (2006.01)
  H04L 29/08 (2006.01)

(52) U.S. Cl.
  CPC .......... H04L 49/354 (2013.01); H04L 49/602 (2013.01); H04L 69/324 (2013.01); H04L 69/325 (2013.01)

(58) Field of Classification Search
  CPC . H04L 69/324; H04L 69/325; H04L 12/4641; H04L 12/4691; H04L 49/351
  See application file for complete search history.

(56) References Cited

U.S. PATENT DOCUMENTS

| | | |
|---|---|---|
| 5,948,061 A | 9/1999 | Merriman et al. |
| 5,951,634 A | 9/1999 | Sitbon et al. |
| 5,959,989 A | 9/1999 | Gleeson |
| 6,006,269 A | 12/1999 | Phaal |
| 6,006,333 A | 12/1999 | Nielsen |
| 6,078,956 A | 6/2000 | Bryant et al. |
| 6,092,178 A | 7/2000 | Jindal et al. |
| 6,112,239 A | 8/2000 | Kenner et al. |
| 6,115,752 A | 9/2000 | Chauhan |
| 6,128,279 A | 10/2000 | O'Neil et al. |
| 6,128,642 A | 10/2000 | Doraswamy et al. |
| 6,148,410 A | 11/2000 | Baskey et al. |
| 6,167,445 A | 12/2000 | Gai et al. |
| 6,167,446 A | 12/2000 | Lister et al. |
| 6,182,139 B1 | 1/2001 | Brendel |
| 6,195,691 B1 | 2/2001 | Brown |
| 6,205,477 B1 | 3/2001 | Johnson et al. |
| 6,233,604 B1 | 5/2001 | Van Horne et al. |
| 6,260,070 B1 | 7/2001 | Shah |
| 6,286,039 B1 | 9/2001 | Van Horne et al. |
| 6,286,047 B1 | 9/2001 | Ramanathan et al. |
| 6,304,913 B1 | 10/2001 | Rune |
| 6,324,580 B1 | 11/2001 | Jindal et al. |
| 6,327,622 B1 | 12/2001 | Jindal et al. |
| 6,336,137 B1 | 1/2002 | Lee et al. |
| 6,381,627 B1 | 4/2002 | Kwan et al. |
| 6,389,462 B1 | 5/2002 | Cohen et al. |
| 6,427,170 B1 | 7/2002 | Sitaraman et al. |
| 6,434,118 B1 | 8/2002 | Kirschenbaum |
| 6,438,652 B1 | 8/2002 | Jordan et al. |
| 6,446,121 B1 | 9/2002 | Shah et al. |
| 6,449,657 B2 | 9/2002 | Stanbach, Jr. et al. |
| 6,470,389 B1 | 10/2002 | Chung et al. |
| 6,473,802 B2 | 10/2002 | Masters |
| 6,480,508 B1 | 11/2002 | Mwikalo et al. |
| 6,490,624 B1 | 12/2002 | Sampson et al. |
| 6,549,944 B1 | 4/2003 | Weinberg et al. |
| 6,567,377 B1 | 5/2003 | Vepa et al. |
| 6,578,066 B1 | 6/2003 | Logan et al. |
| 6,606,643 B1 | 8/2003 | Emens et al. |
| 6,665,702 B1 | 12/2003 | Zisapel et al. |
| 6,671,275 B1 | 12/2003 | Wong et al. |
| 6,681,232 B1 | 1/2004 | Sistanizadeh et al. |
| 6,681,323 B1 | 1/2004 | Fontanesi et al. |
| 6,691,165 B1 | 2/2004 | Bruck et al. |
| 6,697,368 B2 | 2/2004 | Chang et al. |
| 6,735,218 B2 | 5/2004 | Chang et al. |
| 6,745,241 B1 | 6/2004 | French et al. |
| 6,751,616 B1 | 6/2004 | Chan |
| 6,754,706 B1 | 6/2004 | Swildens et al. |
| 6,772,211 B2 | 8/2004 | Lu et al. |
| 6,779,017 B1 | 8/2004 | Lamberton et al. |
| 6,789,125 B1 | 9/2004 | Aviani et al. |
| 6,821,891 B2 | 11/2004 | Chen et al. |
| 6,826,198 B2 | 11/2004 | Turina et al. |
| 6,831,891 B2 | 12/2004 | Mansharamani et al. |
| 6,839,700 B2 | 1/2005 | Doyle et al. |
| 6,850,984 B1 | 2/2005 | Kalkunte et al. |
| 6,874,152 B2 | 3/2005 | Vermeire et al. |
| 6,879,995 B1 | 4/2005 | Chinta et al. |
| 6,898,633 B1 | 5/2005 | Lyndersay et al. |
| 6,901,072 B1 | 5/2005 | Wong |
| 6,901,081 B1 | 5/2005 | Ludwig |
| 6,920,498 B1 | 7/2005 | Gourlay et al. |
| 6,928,485 B1 | 8/2005 | Krishnamurthy et al. |
| 6,944,678 B2 | 9/2005 | Lu |
| 6,963,914 B1 | 11/2005 | Breitbart et al. |
| 6,963,917 B1 | 11/2005 | Callis et al. |
| 6,985,956 B2 | 1/2006 | Luke et al. |
| 6,987,763 B2 | 1/2006 | Rochberger et al. |
| 6,996,615 B1 | 2/2006 | Mcguire |
| 6,996,616 B1 | 2/2006 | Leighton et al. |
| 7,000,007 B1 | 2/2006 | Valenti |
| 7,009,968 B2 | 3/2006 | Ambe et al. |
| 7,020,698 B2 | 3/2006 | Andrews et al. |
| 7,020,714 B2 | 3/2006 | Kalyanaraman et al. |
| 7,028,083 B2 | 4/2006 | Levine et al. |
| 7,031,304 B1 | 4/2006 | Arberg et al. |
| 7,032,010 B1 | 4/2006 | Swildens et al. |
| 7,036,039 B2 | 4/2006 | Holland |
| 7,058,706 B1 | 6/2006 | Iyer et al. |
| 7,058,717 B2 | 6/2006 | Chao et al. |
| 7,062,642 B1 | 6/2006 | Langrind et al. |
| 7,086,061 B1 | 8/2006 | Joshi et al. |
| 7,089,293 B2 | 8/2006 | Grosner et al. |
| 7,117,530 B1 | 10/2006 | Lin |
| 7,126,910 B1 | 10/2006 | Sridhar |
| 7,127,713 B2 | 10/2006 | Davis et al. |
| 7,136,932 B1 | 11/2006 | Schneider et al. |
| 7,139,242 B2 | 11/2006 | Bays et al. |
| 7,177,933 B2 | 2/2007 | Foth et al. |
| 7,185,052 B2 | 2/2007 | Day et al. |
| 7,187,687 B1 | 3/2007 | Davis et al. |
| 7,188,189 B2 | 3/2007 | Karol et al. |
| 7,197,547 B1 | 3/2007 | Miller et al. |
| 7,206,806 B2 | 4/2007 | Pineau et al. |
| 7,215,637 B1 | 5/2007 | Ferguson et al. |
| 7,225,272 B2 | 5/2007 | Kelley et al. |
| 7,240,015 B1 | 7/2007 | Karmouch et al. |
| 7,240,100 B1 | 7/2007 | Wein et al. |
| 7,254,626 B1 | 8/2007 | Kommula et al. |
| 7,257,642 B1 | 8/2007 | Bridger et al. |
| 7,260,645 B2 | 8/2007 | Bays |
| 7,266,117 B1 | 9/2007 | Davis |
| 7,266,120 B2 | 9/2007 | Cheng et al. |
| 7,277,954 B1 | 10/2007 | Stewart et al. |
| 7,292,573 B2 | 11/2007 | LaVigne et al. |
| 7,296,088 B1 | 11/2007 | Padmanabhan et al. |
| 7,321,926 B1 | 1/2008 | Zhang et al. |
| 7,424,018 B2 | 9/2008 | Gallatin et al. |
| 7,436,832 B2 | 10/2008 | Gallatin et al. |
| 7,440,467 B2 | 10/2008 | Gallatin et al. |
| 7,441,945 B2 | 10/2008 | Skene et al. |
| 7,450,527 B2 | 11/2008 | Smith |
| 7,454,500 B1 | 11/2008 | Hsu et al. |
| 7,483,374 B2 | 1/2009 | Nilakantan et al. |
| 7,492,713 B1 | 2/2009 | Turner et al. |
| 7,506,065 B2 | 3/2009 | LaVigne et al. |
| 7,555,562 B2 | 6/2009 | See et al. |
| 7,558,195 B1 | 7/2009 | Kuo et al. |
| 7,574,508 B1 | 8/2009 | Kommula |
| 7,581,009 B1 | 8/2009 | Hsu et al. |
| 7,584,301 B1 | 9/2009 | Joshi |
| 7,587,487 B1 | 9/2009 | Gunturu |
| 7,606,203 B1 | 10/2009 | Shabtay et al. |
| 7,647,427 B1 | 1/2010 | Devarapalli |
| 7,657,629 B1 | 2/2010 | Kommula |
| 7,690,040 B2 | 3/2010 | Frattura et al. |
| 7,706,363 B1 | 4/2010 | Daniel et al. |
| 7,716,370 B1 | 5/2010 | Devarapalli |

(56) References Cited

U.S. PATENT DOCUMENTS

| | | | |
|---|---|---|---|
| 7,720,066 B2 | 5/2010 | Weyman et al. |
| 7,720,076 B2 | 5/2010 | Dobbins et al. |
| 7,747,737 B1 | 6/2010 | Apte et al. |
| 7,756,965 B2 | 7/2010 | Joshi |
| 7,774,833 B1 | 8/2010 | Szeto et al. |
| 7,787,454 B1 | 8/2010 | Won et al. |
| 7,792,047 B2 | 9/2010 | Gallatin et al. |
| 7,835,348 B2 | 11/2010 | Kasratikar et al. |
| 7,835,358 B2 | 11/2010 | Gallatin et al. |
| 7,840,678 B2 | 11/2010 | Joshi |
| 7,848,326 B1 | 12/2010 | Leong et al. |
| 7,889,748 B1 | 2/2011 | Leong et al. |
| 7,899,899 B2 | 3/2011 | Joshi |
| 7,940,766 B2 | 5/2011 | Olakangil et al. |
| 7,953,089 B1 | 5/2011 | Ramakrishnan et al. |
| 8,208,494 B2 | 6/2012 | Leong |
| 8,238,344 B1 | 8/2012 | Chen et al. |
| 8,239,960 B2 | 8/2012 | Frattura et al. |
| 8,248,928 B1 * | 8/2012 | Wang | H04L 43/026 370/230 |
| 8,270,845 B2 | 9/2012 | Cheung et al. |
| 8,315,256 B2 | 11/2012 | Leong et al. |
| 8,386,846 B2 | 2/2013 | Cheung |
| 8,391,286 B2 | 3/2013 | Gallatin et al. |
| 8,504,721 B2 | 8/2013 | Hsu et al. |
| 8,514,718 B2 | 8/2013 | Zijst |
| 8,537,697 B2 | 9/2013 | Leong et al. |
| 8,570,862 B1 | 10/2013 | Leong et al. |
| 8,615,008 B2 | 12/2013 | Natajaran et al. |
| 8,654,651 B2 | 2/2014 | Leong et al. |
| 8,824,466 B2 | 9/2014 | Won et al. |
| 8,830,819 B2 | 9/2014 | Leong et al. |
| 8,873,557 B2 | 10/2014 | Nguyen et al. |
| 8,891,527 B2 | 11/2014 | Wang |
| 8,897,138 B2 | 11/2014 | Yu et al. |
| 8,953,458 B2 | 2/2015 | Leong et al. |
| 9,155,075 B2 | 10/2015 | Song et al. |
| 9,264,446 B2 | 2/2016 | Goldfarb et al. |
| 9,270,566 B2 | 2/2016 | Wang et al. |
| 9,294,367 B2 | 3/2016 | Natarajan et al. |
| 9,380,002 B2 | 6/2016 | Johansson et al. |
| 9,479,415 B2 | 10/2016 | Natajaran et al. |
| 9,565,138 B2 | 2/2017 | Chen et al. |
| 9,866,478 B2 | 1/2018 | Laxman et al. |
| 10,069,764 B2 | 9/2018 | Chen et al. |
| 2001/0049741 A1 | 12/2001 | Skene et al. |
| 2001/0052016 A1 | 12/2001 | Skene et al. |
| 2002/0018796 A1 | 2/2002 | Wironen |
| 2002/0023089 A1 | 2/2002 | Woo |
| 2002/0026551 A1 | 2/2002 | Kamimaki et al. |
| 2002/0038360 A1 | 3/2002 | Andrews et al. |
| 2002/0055939 A1 | 5/2002 | Nardone et al. |
| 2002/0059170 A1 | 5/2002 | Vange |
| 2002/0059464 A1 | 5/2002 | Hata et al. |
| 2002/0062372 A1 | 5/2002 | Hong et al. |
| 2002/0078233 A1 | 6/2002 | Biliris et al. |
| 2002/0091840 A1 | 7/2002 | Pulier et al. |
| 2002/0112036 A1 | 8/2002 | Bohannon et al. |
| 2002/0120743 A1 | 8/2002 | Shabtay et al. |
| 2002/0124096 A1 | 9/2002 | Loguinov et al. |
| 2002/0133601 A1 | 9/2002 | Kennamer et al. |
| 2002/0150048 A1 | 10/2002 | Ha et al. |
| 2002/0154600 A1 | 10/2002 | Ido et al. |
| 2002/0188862 A1 | 12/2002 | Trethewey et al. |
| 2002/0194324 A1 | 12/2002 | Guha |
| 2002/0194335 A1 | 12/2002 | Maynard |
| 2003/0023744 A1 | 1/2003 | Sadot et al. |
| 2003/0031185 A1 | 2/2003 | Kikuchi et al. |
| 2003/0035430 A1 | 2/2003 | Islam et al. |
| 2003/0065711 A1 | 4/2003 | Acharya et al. |
| 2003/0065763 A1 | 4/2003 | Swildens et al. |
| 2003/0105797 A1 | 6/2003 | Dolev et al. |
| 2003/0115283 A1 | 6/2003 | Barbir et al. |
| 2003/0135509 A1 | 7/2003 | Davis et al. |
| 2003/0202511 A1 | 10/2003 | Sreejith et al. |
| 2003/0210686 A1 | 11/2003 | Terrell et al. |
| 2003/0210694 A1 | 11/2003 | Jayaraman et al. |
| 2003/0229697 A1 | 12/2003 | Borella |
| 2004/0019680 A1 | 1/2004 | Chao et al. |
| 2004/0024872 A1 | 2/2004 | Kelley et al. |
| 2004/0032868 A1 * | 2/2004 | Oda | H04L 12/4641 370/389 |
| 2004/0064577 A1 | 4/2004 | Dahlin et al. |
| 2004/0066780 A1 * | 4/2004 | Shankar | H04L 12/4645 370/389 |
| 2004/0194102 A1 | 9/2004 | Neerdaels |
| 2004/0243718 A1 | 12/2004 | Fujiyoshi et al. |
| 2004/0249939 A1 | 12/2004 | Amini et al. |
| 2004/0249971 A1 | 12/2004 | Klinker |
| 2005/0021883 A1 | 1/2005 | Shishizuka et al. |
| 2005/0033858 A1 | 2/2005 | Swildens et al. |
| 2005/0060418 A1 | 3/2005 | Sorokupud |
| 2005/0060427 A1 | 3/2005 | Phillips et al. |
| 2005/0086295 A1 | 4/2005 | Cunningham et al. |
| 2005/0149531 A1 | 7/2005 | Srivastava |
| 2005/0169180 A1 | 8/2005 | Ludwig |
| 2005/0190695 A1 | 9/2005 | Phaal |
| 2005/0207417 A1 | 9/2005 | Ogawa et al. |
| 2005/0278565 A1 | 12/2005 | Frattura et al. |
| 2005/0286416 A1 | 12/2005 | Shimonishi et al. |
| 2006/0036743 A1 | 2/2006 | Deng et al. |
| 2006/0039374 A1 | 2/2006 | Belz et al. |
| 2006/0045082 A1 | 3/2006 | Fertell et al. |
| 2006/0143300 A1 | 6/2006 | See et al. |
| 2007/0053296 A1 | 3/2007 | Yazaki et al. |
| 2007/0104192 A1 * | 5/2007 | Yoon | H04L 12/4641 370/389 |
| 2007/0195761 A1 | 8/2007 | Tatar et al. |
| 2007/0233891 A1 | 10/2007 | Luby et al. |
| 2008/0002591 A1 | 1/2008 | Ueno |
| 2008/0031141 A1 | 2/2008 | Lean et al. |
| 2008/0089336 A1 | 4/2008 | Mercier et al. |
| 2008/0137660 A1 | 6/2008 | Olakangil et al. |
| 2008/0159141 A1 | 7/2008 | Soukup et al. |
| 2008/0181119 A1 | 7/2008 | Beyers et al. |
| 2008/0195731 A1 | 8/2008 | Harmel et al. |
| 2008/0225710 A1 | 9/2008 | Raja et al. |
| 2008/0304423 A1 | 12/2008 | Chuang et al. |
| 2009/0135835 A1 | 5/2009 | Gallatin et al. |
| 2009/0262745 A1 | 10/2009 | Leong et al. |
| 2010/0011126 A1 | 1/2010 | Hsu et al. |
| 2010/0135323 A1 | 6/2010 | Leong |
| 2010/0209047 A1 | 8/2010 | Cheung et al. |
| 2010/0293296 A1 | 11/2010 | Hsu et al. |
| 2010/0325178 A1 | 12/2010 | Won et al. |
| 2011/0044349 A1 | 2/2011 | Gallatin et al. |
| 2011/0058566 A1 | 3/2011 | Leong et al. |
| 2011/0211443 A1 | 9/2011 | Leong et al. |
| 2011/0216771 A1 | 9/2011 | Gallatin et al. |
| 2012/0023340 A1 | 1/2012 | Cheung |
| 2012/0103518 A1 | 5/2012 | Kakimoto et al. |
| 2012/0157088 A1 | 6/2012 | Gerber et al. |
| 2012/0243533 A1 | 9/2012 | Leong |
| 2012/0257635 A1 | 10/2012 | Gallatin et al. |
| 2013/0010613 A1 | 1/2013 | Cafarelli et al. |
| 2013/0034107 A1 | 2/2013 | Leong et al. |
| 2013/0156029 A1 | 6/2013 | Gallatin et al. |
| 2013/0173784 A1 | 7/2013 | Wang et al. |
| 2013/0201984 A1 | 8/2013 | Wang |
| 2013/0259037 A1 | 10/2013 | Natarajan et al. |
| 2013/0272135 A1 | 10/2013 | Leong |
| 2014/0016500 A1 | 1/2014 | Leong et al. |
| 2014/0022916 A1 | 1/2014 | Natajaran et al. |
| 2014/0029451 A1 | 1/2014 | Nguyen |
| 2014/0204747 A1 | 7/2014 | Yu et al. |
| 2014/0321278 A1 | 10/2014 | Cafarelli et al. |
| 2015/0033169 A1 | 1/2015 | Lection et al. |
| 2015/0170920 A1 | 6/2015 | Purayath et al. |
| 2015/0180802 A1 | 6/2015 | Chen et al. |
| 2015/0215841 A1 | 7/2015 | Hsu et al. |
| 2016/0164768 A1 | 6/2016 | Natarajan et al. |
| 2016/0204996 A1 | 7/2016 | Lindgren et al. |
| 2016/0285735 A1 | 9/2016 | Chen et al. |
| 2016/0285762 A1 | 9/2016 | Chen et al. |

(56) References Cited

U.S. PATENT DOCUMENTS

2016/0285763 A1    9/2016   Laxman et al.
2017/0187649 A1    6/2017   Chen et al.
2019/0116133 A1    4/2019   Chen et al.

FOREIGN PATENT DOCUMENTS

WO    WO 2010/135474 A1    11/2010
WO    WO 2015/116538 A1    8/2015

OTHER PUBLICATIONS

U.S. Appl. No. 60/182,812, filed Feb. 16, 2000.
U.S. Appl. No. 60/998,410, filed Oct. 9, 2007.
U.S. Appl. No. 61/919,244, filed Dec. 20, 2013.
U.S. Appl. No. 61/932,650, filed Jan. 28, 2014.
U.S. Appl. No. 61/994,693, filed May 16, 2014.
U.S. Appl. No. 62/088,434, filed Dec. 5, 2014.
U.S. Appl. No. 62/137,073, filed Mar. 23, 2015.
U.S. Appl. No. 62/137,084, filed Mar. 23, 2015.
U.S. Appl. No. 62/137,106, filed Mar. 23, 2015.
PCT Patent Application No. PCT/US2015/012915 filed on Jan. 26, 2015 by Hsu et al.
International Application No. PCT/US2015/012915, International Search Report and Written Opinion dated Apr. 10, 2015, 15 pages.
Gigamon, Visibility Fabric; More than Tap and Aggregation.bmp, 2014, 1 page.
Gigamon, Service Provider System Reference Architecture for the Visibility Fabric White Paper; 5004-01; Mar. 2014, 11 pages.
Gigamon, Enterprise System Reference Architecture for the Visibility Fabric White Paper; 5005-03, Oct. 2014, 13 pages.
Gigamon, Visibility Fabric Architecture Solution Brief, 2012-2013, 2 pages.
Gigamon, Vistapointe Technology Solution Brief; Visualize-Optimize-Monetize-3100-02, Feb. 2014, 2 pages.
Gigamon, Netflow Generation Feature Brief; 3099-04, Oct. 2014, 2 pages.
Ixia Anue GTP Session Controller; Solution Brief; 915-6606-01 Rev. A, Sep. 2013, 2 pages.
Gigamon Adaptive Packet Filtering, Feature Brief 3098-03, Apr. 2015, 3 pages.
Gigamon, Enabling Network Monitoring at 40 Gbps and 100 Gbps with Flow Mapping Technology White Paper, 2012, 4 pages.
Gigamon, Maintaining 3G and 4G LTE Quality of Service White Paper, 2012, 4 pages.
Gigamon, Unified Visibility Fabric Solution Brief; 3018-03, Jan. 2015, 4 pages.
Gigamon, GigaVUE-HB1 Data Sheet; 4011-07, Oct. 2014, 4 pages.
Gigamon, Unified Visibility Fabric; https://www.gigamon.com/unified-visibility-fabric; Apr. 7, 2015, 5 pages.
Gigamon, Active Visibility for Multi-Tiered Security Solutions Overview; 3127-02, Oct. 2014, 5 pages.
Netscout, nGenius Subscriber Intelligence; Data Sheet; SPDS_001-12; 2012, 6 pages.
Gigamon, Unified Visibility Fabric—A New Approach to Visibility White Paper; 3072-04; Jan. 2015, 6 pages.
Netscout, Comprehensive Core-to-Access IP Session Analysis for GPRS and UMTS Networks; Technical Brief; Jul. 16, 2010, 6 pages.
Gigamon, Gigamon Intelligent Flow Mapping White Paper; 3039-02; Aug. 2013, 7 pages.
Gigamon, Monitoring, Managing, and Securing SDN Deployments White Paper; 3106-01, May 2014, 7 pages.
Gigamon, The Visibility Fabric Architecture—A New Approach to Traffic Visibility White Paper, 2012-2013, 8 pages.
Gigamon, Application Note Stateful GTP Correlation; 4025-02, Dec. 2013, 9 pages.
Brocade IP Network Leadership Technology, Enabling Non-Stop Networking for Stackable Switches with Hitless Failover, 2010, 3 pages.
Ixia, Creating a Visibility Architecture—A New Perspective on Network Visibility White Paper, 915-6581-01 Rev. A, Feb. 2014, 14 pages.
Foundry Networks, Server Load Balancing in Today's Web-enabled Enterprises, White Paper, Apr. 2002, 10 pages.
Brocade Communications Systems, Brocade and IBM Real-Time Network Analysis Solution, 2011, 2 pages.
IBM, IBM User Guide, Solaris and Windows NT, Third Edition, Version 2.1 AIX, Mar. 1999, 102 pages.
NTOP, Monitoring Mobile Networks (2G, 3G, and LTE) using nProbe, available online at http://www.ntop.org/nprobe/monitoring-mobile-networks-2g-3gand-lte-using-nprobe, Apr. 2, 2015, 4 pages.
Cisco Systems Inc., Cisco LocalDirector Version 1.6.3 Release Notes, Oct. 1997, 52 pages.
Civil Action CV10-03428-A10 Networks, Inc.'s, Lee Chen's, Rajkumar Jalan's, Ron Szeto's, Liang Han's, and Steve Hwang's Answer to Third Amended Complaint, Affirmative Defenses and A1O's Counterclaims, May 16, 2011, 40 pages.
Civil Action CV10-03428—Defendant, David Cheung's Answer to Plaintiff's First Amended Cmplaint, Nov. 11, 2010, 32 pages.
Civil Action CV10-03428—Second Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage, Inference with Contract, and Unfair Competition Under Cal. Bus. & Prof. C, Apr. 13, 2011, 238 pages.
Civil Action CV10-03428—Third Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage, Inference with Contract, and Unfair Competition Under Cal. Bus. & Prof. C, Apr. 29, 2011, 576 pages.
Foundry ServerIron Installation and Configuration Guide—Table of Contents, http://www.foundrynetworks.com/techdocs/SI/index.html, available as early as Aug. 15, 2000, 784 pages.
Delgadillo, Cisco Distributed Director, White Paper, Apr. 15, 1999, 19 pages.
Foundry Networks Announces Application Aware Layer 7 Switching on SeverIron Platform, Mar. 12, 1999, 4 pages.

* cited by examiner

RULED-BASED NETWORK TRAFFIC INTERCEPTION AND DISTRIBUTION SCHEME

CROSS-REFERENCES TO RELATED APPLICATIONS

The present application is a continuation of U.S. patent application Ser. No. 15/425,777 filed Feb. 6, 2017 (now U.S. Pat. No. 10,069,764), which is a continuation of U.S. patent application Ser. No. 14/320,138, filed on Jun. 30, 2014 (now U.S. Pat. No. 9,565,138), which claims priority under 35 U.S.C. § 119(e) to U.S. Provisional Patent Application No. 61/919,244 filed Dec. 20, 2013, each of which are incorporated by reference herein in their entirety.

The present application is related to U.S. Pat. No. 8,615,008 filed Jul. 11, 2007, titled DUPLICATING NETWORK TRAFFIC THROUGH TRANSPARENT VLAN FLOODING, the entirety of which is incorporated by reference herein.

BACKGROUND

The disclosure herein pertains generally to the field of computer networks. An operator of a telecommunication network can find it beneficial to analyze the traffic that flows through that network. Such analysis might be performed for a variety of different reasons. For example, the operator might want to obtain information that could be used as business intelligence. For another example, the operator might want to detect and pre-empt attacks being made through the network. In order to help prevent such attacks, the operator might want to analyze traffic to determine the sources from which different types of traffic originate.

Such traffic analysis can be performed at an analytic server that the operator maintains. Data packets flowing through the network can intercepted at network elements situated within the network between the data sources and the data destinations. These network elements can duplicate the data packets prior to forwarding those data packets on toward their ultimate destinations. The network elements can divert the duplicate packets to an analytic server. Due to the vast amount of traffic that flows through the network, the operator might maintain numerous separate analytic servers that are capable of analyzing different portions of the total traffic concurrently. The process of intercepting data packets, duplicating them, and forwarding the duplicates to analytic servers is called "telemetry."

Figure 1:
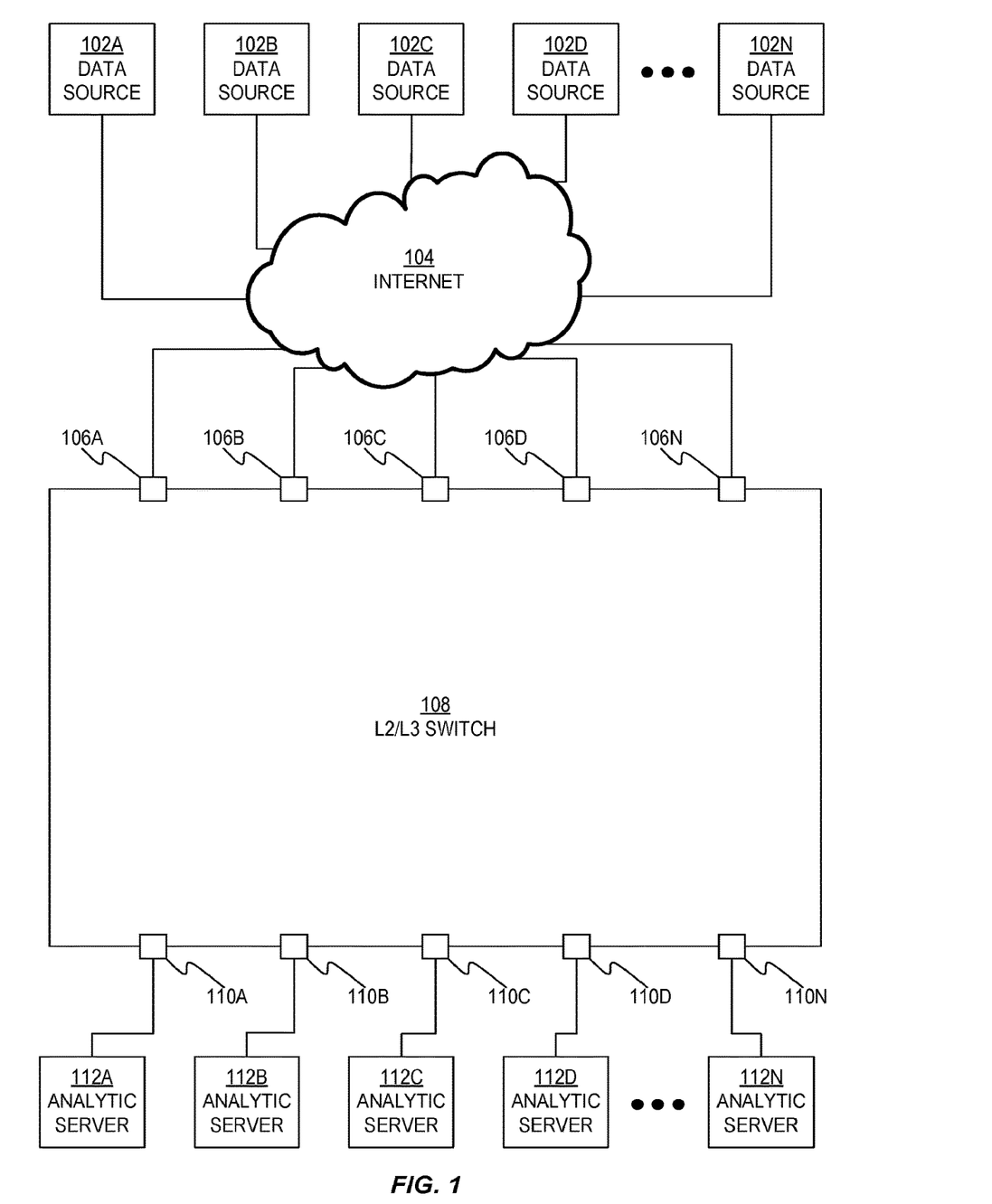
FIG. 1 is a block diagram that illustrates an example of an L2/L3 switch that can receive data packets from various sources, duplicate those data packets, classify those duplicates, and forward the duplicates to various separate analytic servers.

FIG. 1 is a block diagram that illustrates an example 100 of an L2/L3 switch that can receive data packets from various sources, duplicate those data packets, and forward the duplicates to various separate analytic servers. Data sources 102A-N can be communicatively coupled to Internet 104. Data sources 102A-N can address data packets to various specified destinations, typically identified by destination Internet Protocol (IP) addresses. Data sources 102A-N can then send these data packets through Internet 104. Network elements within Internet 104 can forward the data packets hop by hop toward their ultimate destinations.

An L2/L3 switch 108 can be communicatively coupled to (and potentially within) Internet 104. L2/L3 switch 108 can expose a set of ingress ports 106A-N and a set of egress ports 110A-N. Ingress ports 106A-N can communicatively couple L2/L3 switch 108 to various separate network elements within Internet 104. Ingress ports 106A-N can receive data packets that are travelling through Internet 104 on their way to their specified destinations. L2/L3 switch 108 can create duplicates of these arriving data packets.

For each original arriving data packet, L2/L3 switch 108 can look up a next hop for that data packet based on its specified destination. L2/L3 switch 108 can forward each original data packet on toward its next hop through one of the switch's egress ports (not necessarily any of egress ports 110A-N) that is connected to that next hop. In this manner, the original data packets eventually reach their specified destinations.

At least some of egress ports 110A-N can be communicatively coupled to separate analytic servers 112A-N. L2/L3 switch 108 can select one or more of analytic servers 112A-N to be responsible for analyzing the network traffic to which the duplicate data packet belongs. L2/L3 switch 108 can then forward the duplicate data packet out of one of egress ports 110A-N that is communicatively coupled to the one of analytic servers 112A-N that is responsible for analyzing that class of traffic.

Analytic servers 112A-N can receive duplicate data packets from L2/L3 switch 108. Analytic servers 112A-N can perform analysis relative to those packets. Analytic servers 112A-N can generate statistics and reports based on the analysis that they perform.

BRIEF SUMMARY

A L2/L3 switch can carry outgoing traffic on multiple separate virtual local area networks (VLANs). Each such VLAN can be associated with a subset of the switch's ports. Some of these ports can be grouped together into trunks. Under certain scenarios, it is desirable to duplicate data packets received at the switch and to send those duplicates through each of a VLAN's trunks and untrunked ports. Techniques described herein enable data traffic to be load-balanced among the ports of each of the trunks in a VLAN so that those ports are less likely to become overloaded.

According to an implementation, an L2/L3 switch can duplicate an incoming data packet before forwarding the original packet on to its specified destination. The L2/L3 switch can classify the duplicate data packet using rules that are associated with an ingress trunk that includes the ingress port on which the original data packet was received. Based on this class, the L2/L3 switch can select, from among potentially several VLANs, a particular VLAN over which the duplicate data packet is to be carried.

The L2/L3 switch can input certain of the duplicate data packet's attributes into a hash function to produce a "forward identifier" or FID. The L2/L3 switch can select, from among potentially several stored VLAN flooding tables, a particular VLAN flooding table that is associated with the particular VLAN. The rows of the particular VLAN flooding table can specify different combinations of the particular VLAN's egress ports.

The L2/L3 switch can locate, in the particular VLAN flooding table, a particular row that specifies the FID. The L2/L3 switch can read, from the particular row, a specified subset of the egress ports that are associated with the particular VLAN. The subset can specify each of the particular VLAN's untrunked egress ports and also one egress port per trunk that is contained in the particular VLAN. The L2/L3 switch can transmit the duplicate data packet out each of the egress ports specified in the subset, toward analytic servers connected to those egress ports. The L2/L3 switch

DETAILED DESCRIPTION

Using a hash function, an L2/L3 switch can produce an FID for a data packet. The L2/L3 switch can select, from among potentially several stored VLAN flooding tables, a particular VLAN flooding table that is associated with a particular VLAN on which the data packet is to be carried. The rows of the particular VLAN flooding table can specify different combinations of the particular VLAN's egress ports.

The L2/L3 switch can locate, in the particular VLAN flooding table, a particular row that specifies the FID. The L2/L3 switch can read, from the particular row, a specified subset of the egress ports that are associated with the particular VLAN. The L2/L3 switch can transmit copies of the data packet out each of the egress ports specified in the subset, toward analytic servers connected to those egress ports.

Trunked Ports

Figure 2:
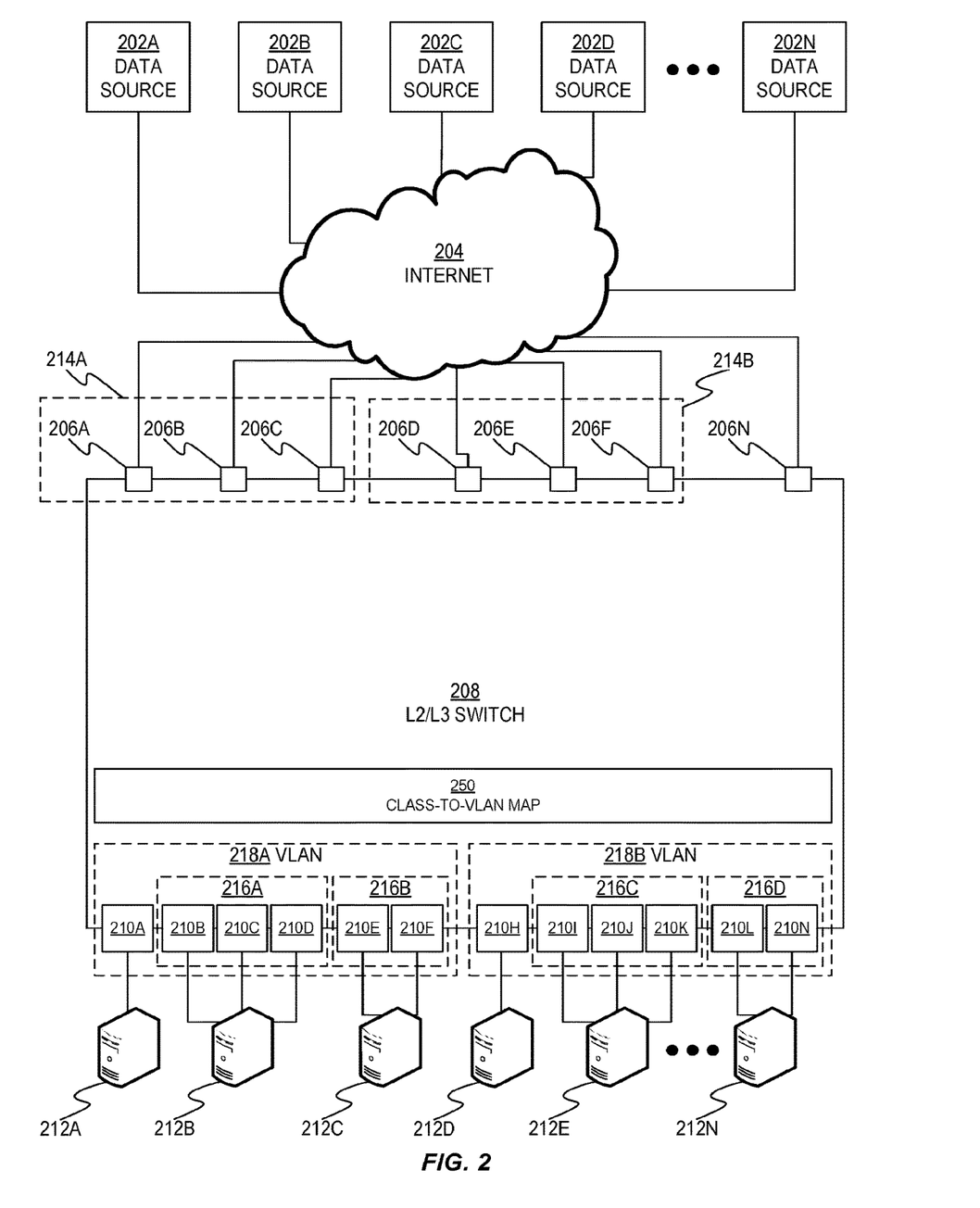
FIG. 2 is a block diagram that illustrates an example of an L2/L3 switch in which certain ports can be grouped together into trunks and in which certain ports can be associated with virtual local area networks (VLANs), according to an embodiment of the invention. .1

FIG. 2 is a block diagram that illustrates an example 200 of an L2/L3 switch in which certain ports can be grouped together into trunks and in which certain ports can be associated with virtual local area networks (VLANs), according to an embodiment of the invention. Data sources 202A-N can be communicatively coupled to Internet 204. Ingress ports 206A-N of L2/L3 switch 208 can receive data packets that travel from data sources 202A-N through Internet 204. Certain ones of ingress ports 206A-N can be grouped together into trunks. For example, ingress ports 206A-C can be grouped together into trunk 214A, while ingress ports 204D-F can be grouped together into trunk 214B.

Data packets incoming to L2/L3 switch 208 can be classified into various classes or categories based on attributes that those data packets possess. Such classification can be performed based on classification rules. According to an implementation, a separate, potentially different set of classification rules can be associated with each separate ingress port of L2/L3 switch 208. In such an implementation, the classification rules that are associated with the ingress port on which a data packet arrives can be applied to that data packet.

According to an implementation, a separate, potentially different set of classification rules also can be associated with each separate trunk (e.g., trunks 214A and 214B) of L2/L3 switch 208. In such an implementation, the classification rules that are associated with the trunk that includes the ingress port on which a data packet arrives can be applied to that data packet. Customized classification rules can be programmed into L2/L3 switch 208 by its owner or operator. For example, a classification rule can map, to a particular class or category, data packets having a header-specified source IP address, destination IP address, source port, destination port, and/or transport layer protocol type (e.g., Transmission Control Protocol (TCP) or User Datagram Protocol (UDP)). Ingress ports 206A-N can be grouped into trunks as desired by the owner or operator of L2/L3 switch 208.

In an embodiment, after a data packet has been classified based on the rules that apply to that data packet, L2/L3 switch 208 can determine, based on the data packet's class or category, through which one of egress ports 212A-N the packet is to be forwarded. This determination may also be based on a VLAN to which that class or category is mapped, as is discussed in greater detail below.

In an implementation, egress ports 210A-N also can be grouped into trunks. As shown in FIG. 2, egress ports 210B, 210C, and 210D are grouped together into trunk 216A. Egress ports 210E and 210F are grouped together into trunk 216B. Egress ports 210I, 210J, and 210K are grouped together into trunk 216C. Egress ports 210L and 210N are grouped together into trunk 216D. Egress ports 210A and 210H are not a part of any trunk, but are "untrunked" ports.

Each of trunks 216A-D and untrunked ports 210A and 210H can be associated with a separate one of analytic servers 212A-N. For example, egress port 210A can forward duplicate data packets to analytic server 212A. Egress ports 210B, 210C, and 210D can, as members of trunk 216A, forward duplicate data packets to analytic server 212B. Egress ports 210E and 210F can, as members of trunk 216B, forward duplicate data packets to analytic server 212C. Egress port 210H can forward duplicate data packets to analytic server 212D. Egress ports 210I, 210J, and 210K can, as members of trunk 216C, forward duplicate data packets to analytic server 212E. Egress ports 210L and 210N can, as members of trunk 216D, forward duplicate data packets to analytic server 212N.

Class-to-VLAN Map

Egress ports that are grouped into trunks, as well as untrunked egress ports, can be associated with various virtual local area networks (VLANs). As shown in FIG. 2, egress ports 210A-F are associated with VLAN 218A, while egress ports 210H-N are associated with VLAN 218B. Although FIG. 2 shows egress ports 210A-N being associated with just one VLAN each, in various embodiments, one or more of egress ports 210A-N could be concurrently associated with multiple separate VLANs.

In an implementation, L2/L3 switch 208 can store a class-to-VLAN map 250 that indicates, for each class or category of data packets, which of the several VLANs should carry the duplicates of data packets belonging to that class or category out of L2/L3 switch 208. Thus, L2/L3 switch 208 can forward duplicate data packets belonging to a class associated with VLAN 218A out of one of the egress ports associated with VLAN 218A (e.g., egress ports 210A-F), while L2/L3 switch 208 can forward duplicate data packets belonging to a class associated with VLAN 218B out of one of the egress ports associated with VLAN 218B (e.g., egress ports 210H-N).

Thus, according to an embodiment, for each data packet arriving on any of ingress ports 206A-N, L2/L3 switch 208 can follow the rules associated with those ingress ports (and/or the trunks to which those ingress ports belong) to determine which of the VLANs will be carrying a duplicate of that data packet out of L2/L3 switch 208 to various ones of analytic servers 212A-N. In an alternative embodiment, a duplicate data packet can be carried out of L2/L3 switch 208 on multiple separate VLANs, each of which can be associated with the duplicate data packet's attributes.

Line Cards

Figure 3:
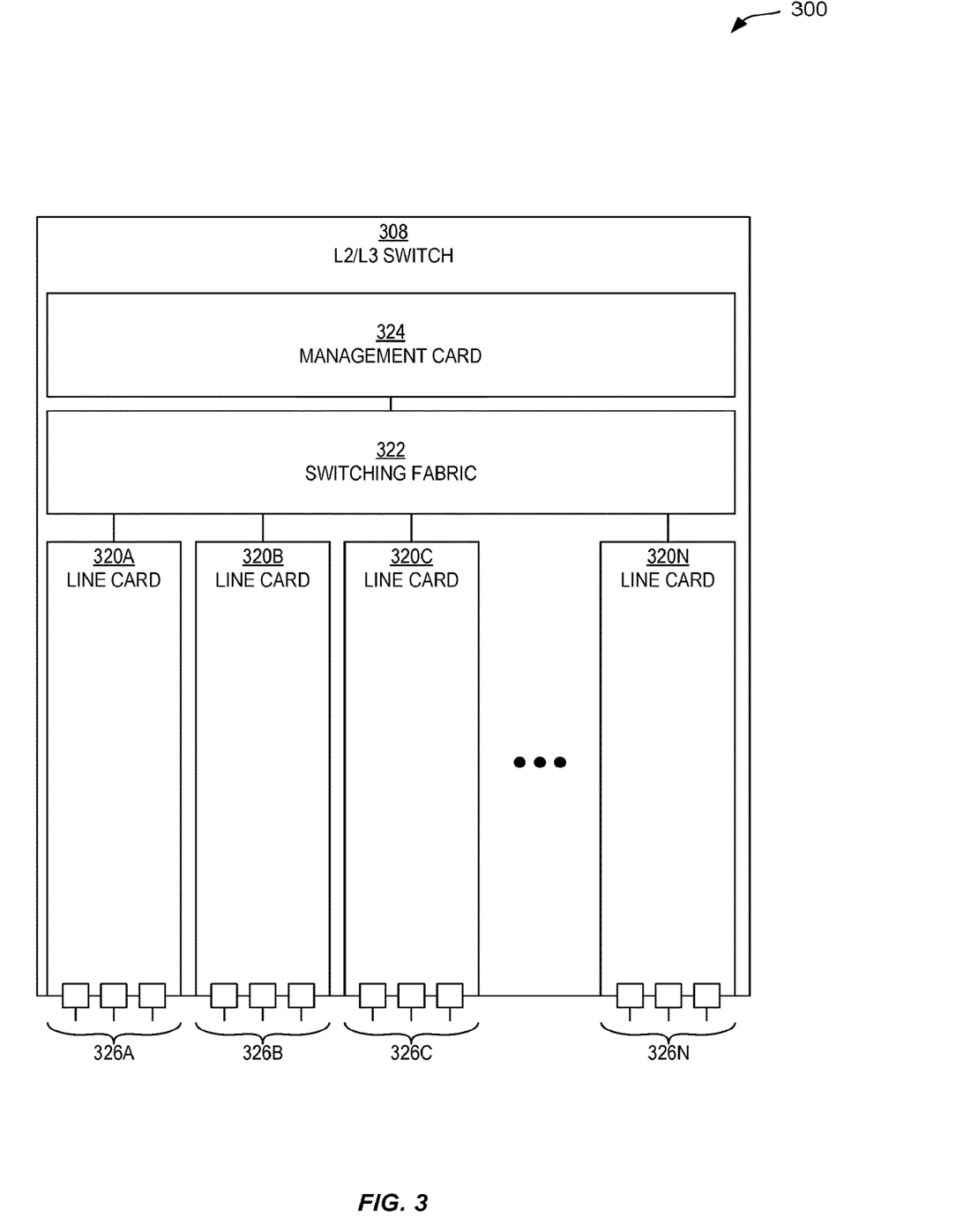
FIG. 3 is a block diagram that illustrates an example of an L2/L3 switch that includes line cards that are interconnected via switching fabric, according to an embodiment of the invention.

FIG. 3 is a block diagram that illustrates an example 300 of an L2/L3 switch that includes line cards that are interconnected via switching fabric, according to an embodiment of the invention. L2/L3 switch 308 can be the same as L2/L3 switch 208 of FIG. 2, viewed at a different level of abstraction.

L2/L3 switch 308 can include line cards 320A-N. Each of line cards 320A-N can include a set of ports, a packet processor, and a content addressable memory (CAM). For example, line card 320A is shown having ports 326A. Line card 320B is shown having ports 326B. Line card 320C is shown having ports 326C. Line card 320N is shown having ports 326N. Ports 326A-N can behave as ingress ports or egress ports. Ports 326A-N can correspond to ingress ports 206A-N and egress ports 210A-N of FIG. 2, for example.

Each of line cards 320A-N can be connected to switching fabric 322. A management card 324 also can be connected to switching fabric 322. Management card 324 can program line cards 320A-N with instructions that govern the behavior of line cards 320A-N. Such instructions can specify the internal addressing behavior that line cards 320A-N are to follow when internally forwarding received data packets to others of line cards 320A-N.

In an embodiment, a data packet can be received at any port within ports 326A-N. The packet processor of the one of line cards 320A-N to which that port belongs can perform rule-based classification relative to the data packet based on the data packet's attributes. That packet processor also can create a duplicate of that data packet. Based on the original data packet's specified destination, the packet processor can perform a lookup in the receiving line card's CAM in order to determine a next hop for the original data packet.

Based on the duplicate data packet's class or category, the packet processor can perform a lookup in the CAM in order to determine a next hop for the duplicate data packet. In the case of a duplicate data packet, the next hop can be based on the VLAN that is associated with the data packet's class or category. The packet processor can internally address both the original data packet and its duplicate to others of line cards 320A-N that possess the ports that are associated with the next hops for those data packets.

The receiving line card can send the original data packet and its duplicate through switching fabric 322, which can use the internal addressing in order to route the data packets within L2/L3 switch 308 to the appropriate sending line cards within line cards 320A-N. These sending line cards can then forward the data packets through the appropriate ones of ports 326A-N toward their ultimate destinations. In the case of an original data packet, the ultimate destination may be a device possessing an Internet Protocol (IP) address matching the destination IP address specified in the original data packet's header. In the case of a duplicate data packet, the ultimate destination may be an analytic server that is connected to the port out of which the sending line card transmits the duplicate data packet.

VLAN Flooding Tables

Figure 4:
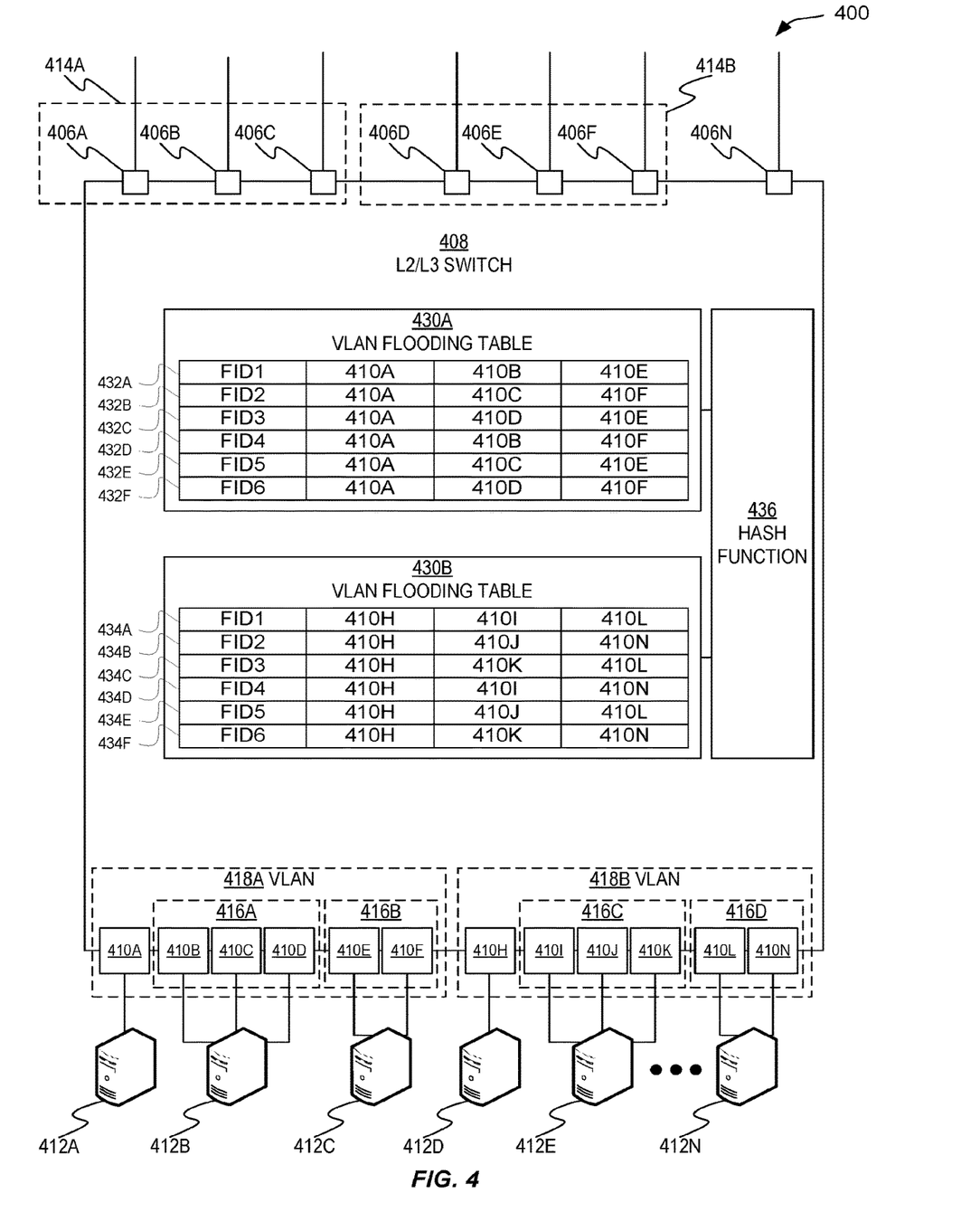
FIG. 4 is a block diagram that illustrates an example of an L2/L3 switch that stores VLAN flooding tables that indicate, for various different hash values, a set of egress ports through which duplicate data packets are to be sent, according to an embodiment of the invention.

FIG. 4 is a block diagram that illustrates an example 400 of an L2/L3 switch that stores VLAN flooding tables that indicate, for various different hash values, a set of egress ports through which duplicate data packets are to be sent, according to an embodiment of the invention. L2/L3 switch 408 can be the same as L2/L3 switch 208 of FIG. 2, viewed at a different level of abstraction.

As shown in FIG. 4, L2/L3 switch 408 can include ingress ports 406A-N, some of which can be grouped into trunks 414A and 414B. L2/L3 switch 408 can further include egress ports 410A-N, some of which can be grouped into trunks 416A-D. Egress ports 410A-F can be associated with VLAN 418A, while egress ports 410H-N can be associated with VLAN 418B. Various ones of egress ports 410A-N can be connected to various ones of analytic servers 412A-N.

In an embodiment, L2/L3 switch 408 can store multiple VLAN flooding tables 430A and 430B. L2/L3 switch 408 can store a separate VLAN flooding table for each VLAN over which L2/L3 switch 408 can carry duplicate data packets. In the illustrated example, L2/L3 switch 408 stores VLAN flooding table 430A for VLAN 418A. L2/L3 switch 408 additionally stores VLAN flooding table 430B for VLAN 418B. Each of line cards 320A-N of FIG. 3 can store a separate copy of each of VLAN flooding tables 430A and 430B. For example, each of line cards 320A-N can store a copy of these VLAN flooding tables in a CAM or other non-volatile memory.

Referring again to FIG. 4, upon receiving a data packet on one of ingress ports 410A-N, L2/L3 switch 408 (and, more specifically, the packet processor of the line card that includes the receiving ingress port) can classify that data packet using rule-based classification. L2/L3 switch 408 can use the data packet's class or category to select a VLAN on which a duplicate of the data packet will be carried. For example, based on the data packet's attributes, L2/L3 switch 408 might determine that the data packet's duplicate is to be carried on VLAN 418A. L2/L3 switch 408 can select, from its VLAN flooding tables (e.g., VLAN flooding tables 430A and 430B), the particular VLAN flooding table that is associated with the selected VLAN. Continuing the previous example, L2/L3 switch 408 can determine that VLAN 418A is associated with VLAN flooding table 430A. Consequently, using entries within the selected VLAN flooding table (in this example, VLAN flooding table 430A), L2/L3 switch 408 can determine through which of (potentially several of) egress ports 410A-N the duplicate data packet is to be sent.

Each of VLAN flooding tables 430A and 430B can contain a set of rows. As illustrated, VLAN flooding table 430A contains rows 432A-F, while VLAN flooding table 430B contains rows 434A-F. In an implementation, the quantity of rows in a particular VLAN table can be based on the quantities of egress ports in the various trunks included within the corresponding VLAN. More specifically, the quantity of rows can be equal to the least common multiple of the numbers of ports in each of the corresponding VLAN's trunks.

Thus, for example, in VLAN 418A, the number of ports in trunk 416A is 3, and the number of ports in trunk 416B is 2. The least common multiple of 2 and 3 is 6, so VLAN flooding table 430A contains 6 rows. Similarly, in VLAN 418B, the number of ports in trunk 416C is 3, and the number of ports in trunk 416D is 2. Again, the least common multiple of 2 and 3 is 6, so VLAN flooding table 430B also contains 6 rows.

In an implementation, each row of VLAN flooding tables 430A and 430B can include a quantity of columns that is equal to the sum of the number of trunks in the corresponding VLAN plus the number of untrunked ports in the corresponding VLAN plus one. For example, in VLAN 418A, there are 2 trunks (i.e., 416A and 416B) and 1 untrunked port (i.e., 410A), so the quantity of columns in each of rows 432A-F is 2+1+1, or 4 columns. Similarly, in VLAN 418B, there are also 2 trunks (i.e., 416C and 416D) and 1 untrunked port (i.e., 410H), so the quantity of columns in each of rows 434A-F is 2+1+1, or 4 columns.

In each VLAN flooding table row, the first column can contain an identifier called an FID (standing for "forward identifier"). This identifier can be produced by a hash function 436. In an implementation, when a data packet is received on an ingress port of a particular line card, the packet processor of that line card can invoke hash function 436 relative to a specified set of the data packet's attributes. Hash function 436 thereby produces a hash value, which will be found in the first column of one of the rows of the selected VLAN flooding table. Thus, rows 432A-F contain FIDs 1-6 in their first columns. Rows 434A-F also contain FIDs 1-6 in their first columns. The row containing the matching hash value is the row that is applicable to the incoming data packet.

In each VLAN flooding table row, the remaining columns can specify the set of egress ports through which the duplicate data packet is to be forwarded. In an implementation, VLAN flooding tables 430A and 430B can be used to load-balance duplicate data packets among subsets of egress ports 410A-N. VLAN flooding tables 430A and 430B can be populated in a manner such that a different subset of the egress ports associated with the corresponding VLANs are specified in each row. For each of VLAN flooding tables 430A and 430B, the rows of that table can collectively contain all of the possible combinations of single-port selections from each of the corresponding VLAN's trunks and untrunked ports. Upon locating the row that has the hash value (or FID) that matches the hash value produced by inputting the duplicate data packet's attributes into hash function 436, L2/L3 switch 408 can cause the duplicate data packet to be forwarded out of each of the egress ports specified in that row.

More specifically, in one implementation, the columns following the first column in each VLAN flooding table row collectively specify one egress port per trunk or untrunked port in the corresponding VLAN. Within a column corresponding to a particular trunk, the rows of the VLAN flooding table can rotate through the egress ports associated with that trunk to achieve a balanced distribution among that trunk's egress ports.

For example, in VLAN flooding table 430A, all of rows 432A-F specify egress port 410A in the second column (since egress port 410A is untrunked). Rows 432A-F rotate through successive ones of egress ports 410B-D in the third column (since egress ports 410B-D belong to the same trunk 416A). Rows 432A-F rotate through successive ones of egress ports 410E and 410F in the fourth column (since egress ports 410E and 410F belong to the same trunk 416B).

By way of operational example, if an incoming data packet's class is associated with VLAN 418B, and if that incoming data packet's attributes hash to FID3, then row 434C of VLAN flooding table 430B will be applicable to the incoming data packet. According to row 434C, duplicates of the incoming data packet are to be sent out through egress ports 410H, 410K, and 410L.

Load-Balancing Within a VLAN's Trunks

Figure 5:
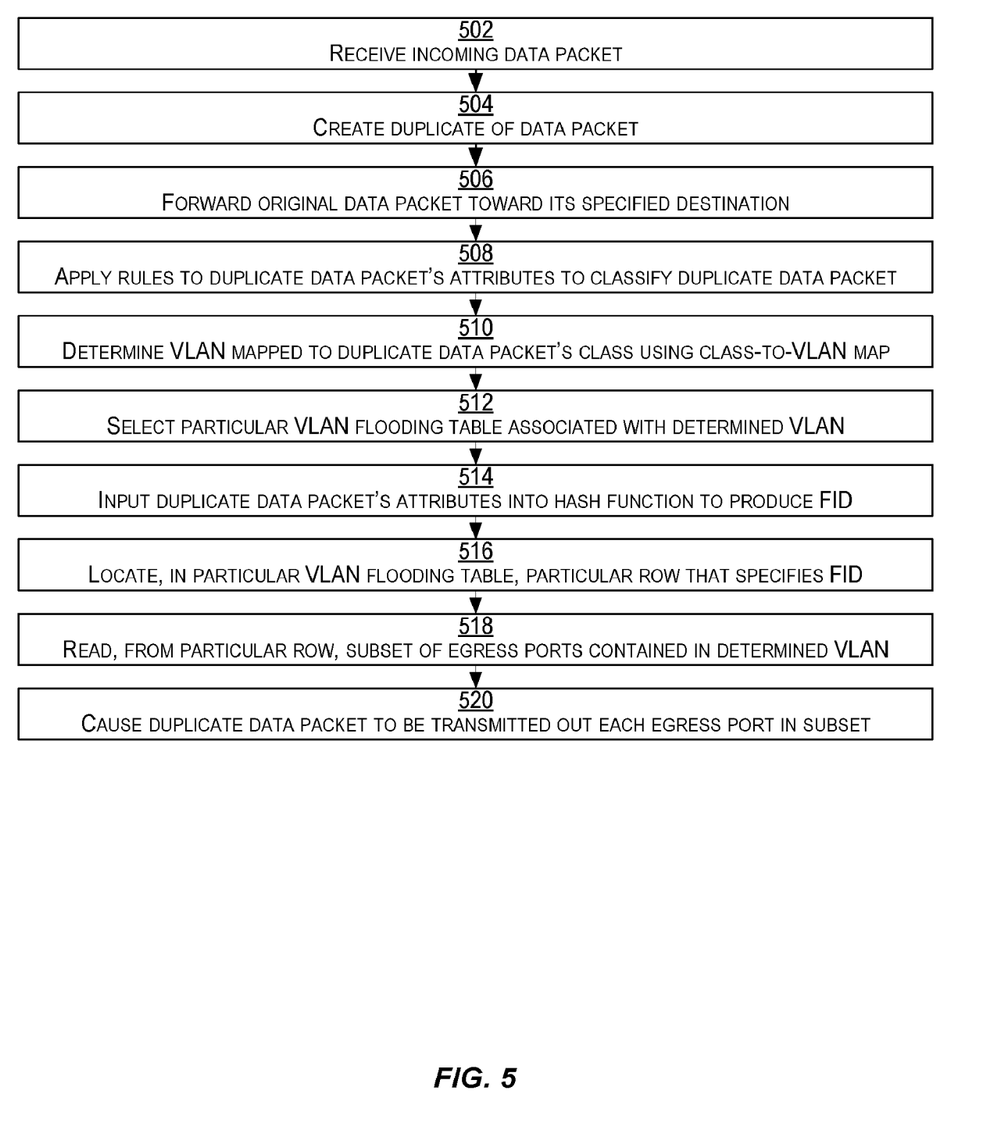
FIG. 5 is a flow diagram that illustrates an example of a technique for load-balancing the transmission of duplicate data packets within each of a selected VLAN's trunks and untrunked ports, according to an embodiment of the invention.

FIG. 5 is a flow diagram that illustrates an example of a technique for load-balancing the transmission of duplicate data packets within each of a selected VLAN's trunks and untrunked ports, according to an embodiment of the invention. The technique can be performed by L2/L3 switch 408 of FIG. 4, for example.

Referring again to FIG. 5, in block 502, an L2/L3 switch receives an incoming data packet. In block 504, the L2/L3 switch creates a duplicate of the data packet. In block 506, the L2/L3 switch forwards the original data packet toward its specified destination.

In block 508, the L2/L3 switch applies rules to the duplicate data packet's attributes in order to classify the duplicate data packet. In block 510, the L2/L3 switch uses a class-to-VLAN map to determine which of several VLANs is mapped to the duplicate data packet's class. In block 512, the L2/L3 switch selects, from among several VLAN flooding tables, a particular VLAN flooding table that is associated with the VLAN determined in block 510.

In block 514, the L2/L3 switch inputs a set of the duplicate data packet's attributes into a hash function in order to produce an FID for the duplicate data packet. In block 516, the L2/L3 switch locates, in the particular VLAN flooding table selected in block 512, a particular row that specifies the FID.

In block 518, the L2/L3 switch reads, from the particular row located in block 516, a subset of the egress ports that are contained in the VLAN determined in block 510. In an embodiment, the subset includes all of the VLAN's untrunked ports (if any) as well as one egress port per trunk of the VLAN. In block 520, the L2/L3 switch causes the duplicate data packet to be transmitted out each of the egress ports in the subset read in block 518. In one implementation, the duplicate data packet can be transmitted through multiple egress ports using the mechanism of VLAN flooding, which is further described in U.S. Pat. No. 8,615,008, which is incorporated by reference herein. In one embodiment, the VLAN flooding technique involves disabling media access control (MAC) learning on one or more ports, thereby forcing the transmission of a packet through multiple ports associated with a VLAN. The duplicate data packet thus reaches each of the analytic servers that is connected to the VLAN determined in block 510.

Example Network Node

Figure 6:
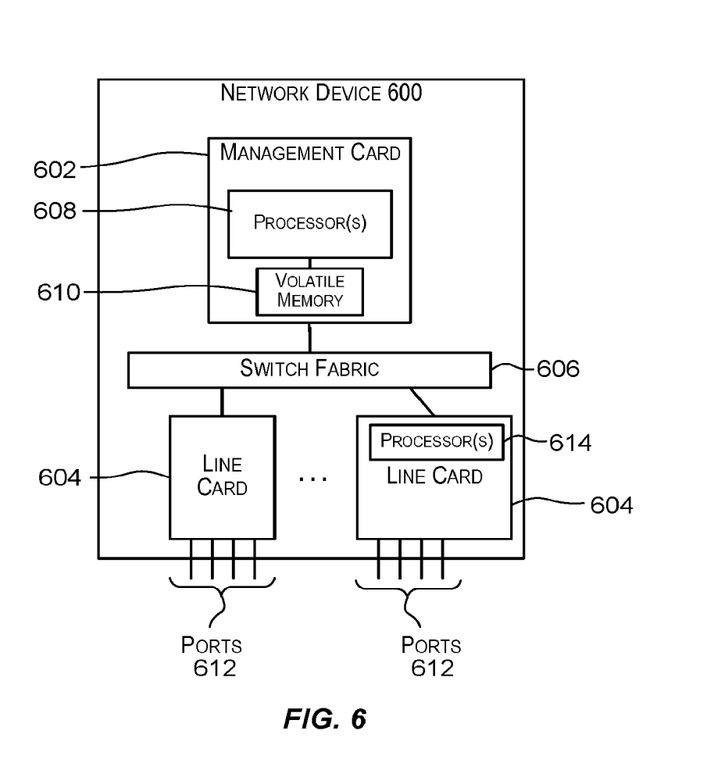
FIG. 6 depicts a simplified block diagram of a network device that may incorporate an embodiment of the present invention.

Various different systems and devices may incorporate an embodiment of the present invention. FIG. 6 provides an example of a network device that may incorporate an embodiment of the present invention. FIG. 6 depicts a simplified block diagram of a network device 600 that may incorporate an embodiment of the present invention (e.g., network device 600 may correspond to nodes depicted in figures above). In the embodiment depicted in FIG. 6, network device 600 comprises a plurality of ports 612 for receiving and forwarding data packets and multiple cards that are configured to perform processing to facilitate forwarding of the data packets to their intended destinations. The multiple cards may include one or more line cards 604 and a management card 602. In one embodiment, a card, sometimes also referred to as a blade or module, can be inserted into one of a plurality of slots on the chassis of network device 600. This modular design allows for flexible configurations with different combinations of cards in the various slots of the device according to differing network topologies and switching requirements. The components of network device 600 depicted in FIG. 6 are meant for illustrative purposes only and are not intended to limit the scope of the invention in any manner. Alternative embodiments may have more or less components than those shown in FIG. 6.

Ports 612 represent the I/O plane for network device 600. Network device 600 is configured to receive and forward packets using ports 612. A port within ports 612 may be classified as an input port or an output port depending upon whether network device 600 receives or transmits a data packet using the port. A port over which a packet is received by network device 600 is referred to as an input or ingress port. A port used for communicating or forwarding a packet from network device 600 is referred to as an output or egress port. A particular port may function both as an input/ingress port and an output/egress port. A port may be connected by a link or interface to a neighboring network device or network. Ports 612 may be capable of receiving and/or transmitting different types of traffic at different speeds including 1 Gigabit/sec, 6 Gigabits/sec, 60 Gigabits/sec, or even more. In some embodiments, multiple ports of network device 600 may be logically grouped into one or more trunks.

Upon receiving a data packet via an input port, network device 600 is configured to determine an output port of device 600 to be used for transmitting the data packet from network device 600 to facilitate communication of the packet to its intended destination. Within network device 600, the packet is forwarded from the input port to the determined output port and then transmitted from network device 600 using the output port. In one embodiment, forwarding of packets from an input port to an output port is performed by one or more line cards 604. Line cards 604 represent the data forwarding plane of network device 600. Each line card may comprise one or more packet processors that are programmed to perform forwarding of data packets from an input port to an output port. In one embodiment, processing performed by a line card may comprise extracting information from a received packet, performing lookups using the extracted information to determine an output port for the packet such that the packet can be forwarded to its intended destination, and to forward the packet to the output port. The extracted information may include, for example, the header of the received packet.

Management card 602 is configured to perform management and control functions for network device 600 and represents the management plane for network device 600. In one embodiment, management card 602 is communicatively coupled to line cards 604 via switch fabric 606. Management card 602 may comprise one or more physical processors 608, one or more of which may be multicore processors. These management card processors may be general purpose multicore microprocessors such as ones provided by Intel, AMD, ARM, Freescale Semiconductor, Inc., and the like, that operate under the control of software stored in associated memory 610. The processors may run one or more VMs. Resources allocated to these VMs may be dynamically changed. In some embodiments, multiple management cards may be provided for redundancy and to increase availability.

In some embodiments, one or more line cards 604 may each comprise one or more physical processors 614, some of which may be multicore. These processors may run one or more VMs. Resources allocated to these VMs may be dynamically changed.

The embodiment depicted in FIG. 6 depicts a chassis-based system. This however is not intended to be limiting. Certain embodiments of the present invention may also be embodied in non-chassis based network devices, which are sometimes referred to as "pizza boxes." Such a network device may comprise a single physical multicore CPU or multiple physical multicore CPUs.

Various embodiments described above can be realized using any combination of dedicated components and/or programmable processors and/or other programmable devices. The various embodiments may be implemented only in hardware, or only in software, or using combinations thereof. For example, the software may be in the form of instructions, programs, etc. stored in a computer-readable memory and may be executed by one or more processing units, where the processing unit is a processor, a core of a processor, or a percentage of a core. In certain embodiments, the various processing described above, including the processing depicted in the flowcharts described above can be performed in software without needing changes to existing device hardware (e.g., router hardware), thereby increasing the economic viability of the solution. Since certain inventive embodiments can be implemented entirely in software, it allows for quick rollouts or turnarounds along with lesser capital investment, which further increases the economic viability and attractiveness of the solution.

The various processes described herein can be implemented on the same processor or different processors in any combination, with each processor having one or more cores. Accordingly, where components or modules are described as being adapted to or configured to perform a certain operation, such configuration can be accomplished, e.g., by designing electronic circuits to perform the operation, by programming programmable electronic circuits (such as microprocessors) to perform the operation, by providing software or code instructions that are executable by the component or module (e.g., one or more processors) to perform the operation, or any combination thereof. Processes can communicate using a variety of techniques including but not limited to conventional techniques for interprocess communication, and different pairs of processes may use different techniques, or the same pair of processes may use different techniques at different times. Further, while the embodiments described above may make reference to specific hardware and software components, those skilled in the art will appreciate that different combinations of hardware and/or software components may also be used and that particular operations described as being implemented in hardware might also be implemented in software or vice versa.

The various embodiments are not restricted to operation within certain specific data processing environments, but are free to operate within a plurality of data processing environments. Additionally, although embodiments have been described using a particular series of transactions, this is not intended to be limiting.

Thus, although specific invention embodiments have been described, these are not intended to be limiting. Various modifications and equivalents are within the scope of the following claims.

What is claimed is:

1. A network device, comprising:
a plurality of virtual local area networks (VLANs), wherein each of the plurality of VLANs is associated with one or more ports;
one or more processors; and
a memory coupled to the one or more processors, wherein the memory includes instructions that, when executed by the one or more processors, cause at least one processor from the one or more processors to perform operations comprising:
determining a class for a packet received at the network device, wherein the class is determined using a first attribute of the packet;
selecting a VLAN from the plurality of VLANs based on the class, wherein the selected VLAN comprises multiple groups of two or more ports;
generating, based on a second attribute of the packet, a first identification value for the packet;
accessing a data structure that comprises a plurality of second identification values, wherein each of the plurality of second identification values is associated with a respective subset of ports of the selected VLAN and wherein the plurality of second identification values are generated using a hash function;
selecting, from the data structure, a subset of ports associated with the first identification value, wherein the selected subset of ports comprises a port from each of the multiple groups of two or more ports; and
sending a copy of the packet through each port from the selected subset of ports.

2. The network device of claim 1, wherein the instructions, when executed by the one or more processors, cause the at least one processor from the one or more processors to perform operations further comprising:
creating the copy of the packet received at the network device; and
transmitting the packet received at the network device to a destination associated with the packet.

3. The network device of claim 1, wherein the instructions, when executed by the one or more processors, cause the at least one processor from the one or more processors to perform operations further comprising:
selecting the data structure from a plurality of data structures based on the selected VLAN.

4. The network device of claim 1, wherein the selected subset of ports further comprises a port not associated with the multiple groups of two or more ports.

5. The network device of claim 1, wherein a number of ports of the selected subset of ports is less than a number of ports associated with the selected VLAN.

6. The network device of claim 1, wherein the selected subset of ports is coupled to one or more analytic servers and the sending the copy of the packet comprises sending the packet to the one or more analytic servers.

7. The network device of claim 1, wherein determining the class for the packet comprises determining the class based on one or more classification rules associated with an ingress port of the network device at which the packet is received.

8. The network device of claim 1, wherein the data structure comprises a table having a plurality of rows and wherein each one of the plurality of rows is associated with a corresponding one of the plurality of second identification values.

9. The network device of claim 8, wherein a number of the plurality of rows is equal to a least common multiple of numbers of ports of the multiple groups of two or more ports.

10. The network device of claim 8, wherein the table comprises a plurality of columns and wherein a number of the plurality of columns is equal to a sum of a number of the multiple groups of two or more ports, a number of ports not associated with any group of ports, and one.

11. A method, comprising:
determining a class for a packet received at a network device that comprises a plurality of virtual local area networks (VLANs), wherein each of the plurality of VLANs is associated with one or more ports;
selecting a VLAN from the plurality of VLANs based on the class, wherein the selected VLAN comprises multiple groups of two or more ports;
generating a first identification value for the packet;
accessing a data structure that comprises a plurality of second identification values, wherein each of the plurality of second identification values is associated with a respective subset of ports of the selected VLAN and wherein the plurality of second identification values are generated using a hash function;
selecting, from the data structure, a subset of ports that is associated with the first identification value, wherein the selected subset of ports comprises a port from each of the multiple groups of two or more ports; and
transmitting a copy of the packet through at least one port from the selected subset of ports.

12. The method of claim 11, further comprising:
creating the copy of the packet received at the network device; and
transmitting the packet received at the network device to a destination associated with the packet.

13. The method of claim 11, further comprising:
selecting the data structure from a plurality of data structures based on the selected VLAN.

14. The method of claim 11, wherein the selected subset of ports is coupled to one or more analytic servers and the transmitting the copy of the packet comprises transmitting the packet to the one or more analytic servers.

15. The method of claim 11, wherein the selected subset of ports further comprises a port not associated with the multiple groups of two or more ports.

16. The method of claim 11, wherein the class for the packet is further determined based on one or more classification rules associated to an ingress port of the network device at which the packet is received.

17. A non-transitory computer-readable device at a network device having instructions stored thereon that, when executed by at least one computing device, causes the at least one computing device to perform operations comprising:
creating a copy of a packet received at the network device;
transmitting the packet to a destination associated with the packet;
determining a class for the copy of the packet, wherein the class is determined using a first attribute of the copy of the packet and wherein the network device comprises a plurality of virtual local area networks (VLANs), wherein each of the plurality of VLANs is associated with one or more ports;

selecting a VLAN from the plurality of VLANs based on the class, wherein the selected VLAN comprises multiple groups of two or more ports;

generating, based on a second attribute of the copy of the packet and a hash function, a first identification value for the copy of the packet;

accessing a data structure that comprises a plurality of second identification values, wherein each of the plurality of second identification values is associated with a respective subset of ports of the selected VLAN and wherein the plurality of second identification values are generated using a hash function;

selecting, from the data structure, a subset of ports associated with the first identification value, wherein the selected subset of ports comprises a port from each of the multiple groups of two or more ports; and transmitting the copy of the packet to one or more analytic servers through each port from the selected subset of ports.

18. The non-transitory computer-readable device of claim 17, the operations further comprising:

selecting the data structure from a plurality of data structures based on the selected VLAN.

19. The non-transitory computer-readable device of claim 17, wherein the selected subset of ports comprises a port not associated with the multiple groups of two or more ports.

* * * * *